US006905405B2

(12) United States Patent
McClintic

(10) Patent No.: US 6,905,405 B2
(45) Date of Patent: Jun. 14, 2005

(54) METHOD AND APPARATUS FOR GAMING USING SYMBOLS MOVABLE IN THE PLANE OF A DISPLAY

(75) Inventor: Monica A. McClintic, Boulder City, NV (US)

(73) Assignee: IGT, Reno, NV (US)

( * ) Notice: Subject to any disclaimer, the term of this patent is extended or adjusted under 35 U.S.C. 154(b) by 197 days.

(21) Appl. No.: 10/005,851

(22) Filed: Dec. 3, 2001

(65) Prior Publication Data

US 2003/0104855 A1 Jun. 5, 2003

(51) Int. Cl.[7] .................................................. A63F 13/00

(52) U.S. Cl. ................ 463/16; 273/138.1; 273/142 HA

(58) Field of Search ......................... 463/12–13, 16–20, 463/29–31, 37, 42; 273/138.1, 143 R, 141 R, 141 A, 143 A, 143 B, 143 C, 459–461, 139, 142 B, 142 H, 142 HA, 142 J, 145 E, 138.2, 292, 148 R, 148 B

(56) References Cited

U.S. PATENT DOCUMENTS

| | | | | | |
|---|---|---|---|---|---|
| 355,947 | A | * | 1/1887 | Parfitt | 273/142 H |
| 636,508 | A | * | 11/1899 | Eickershoff | 273/141 R |
| 818,895 | A | * | 4/1906 | Kuhn | 273/141 R |
| 1,463,290 | A | * | 7/1923 | Moulder | 273/142 H |
| 1,520,316 | A | * | 12/1924 | Stolper | 273/142 H |
| 1,689,380 | A | * | 10/1928 | De Bary | 273/142 H |
| 4,448,419 | A | | 5/1984 | Telnaes | |
| 4,732,386 | A | * | 3/1988 | Rayfiel | 463/20 |
| 4,805,907 | A | | 2/1989 | Hagiwara | 273/138 |
| 4,941,665 | A | * | 7/1990 | Klamer | 273/142 H |
| 5,184,821 | A | * | 2/1993 | Korenek | 273/138.2 |
| 5,752,881 | A | | 5/1998 | Inoue | |
| 6,105,962 | A | | 8/2000 | Malavazos et al. | |
| 6,142,872 | A | | 11/2000 | Walker et al. | 463/16 |
| 6,168,520 | B1 | | 1/2001 | Baerlocher et al. | |
| 6,241,607 | B1 | | 6/2001 | Payne et al. | |
| 6,561,512 | B2 | * | 5/2003 | Luciano et al. | 273/142 HA |
| 2001/0024970 | A1 | | 9/2001 | McKee et al. | 463/16 |
| 2002/0193158 | A1 | * | 12/2002 | Weiss et al. | 463/16 |
| 2003/0181239 | A1 | * | 9/2003 | Walker et al. | 463/20 |

FOREIGN PATENT DOCUMENTS

| | | | | | |
|---|---|---|---|---|---|
| DE | 38 22 636 | | | 1/1990 | |
| EP | 60019 | A1 | * | 9/1982 | G07F/17/34 |
| GB | 2 322 217 | | | 8/1998 | |

OTHER PUBLICATIONS

Fey, Marshall, Slot Machines A Pictorial History of the First 100 Years, 1997, Liberty Belle Books, fifth edition, pp. 70, 78, and 230.*

* cited by examiner

*Primary Examiner*—John M. Hotaling, II
*Assistant Examiner*—Scott E. Jones
(74) *Attorney, Agent, or Firm*—Marshall, Gerstein & Borun LLP

(57) ABSTRACT

Methods of playing games of chance and gaming devices employing a plurality of symbol carriers, each symbol carrier bearing substantially continuously visible symbols. At least one symbol carried by each of the plurality of symbol carriers may be indicated at the end of a play sequence as a chosen symbol, by way of at least one individualized indicator. A combination of chosen symbols is randomly generated during play, and movement of the symbol carriers, indicators or both, as well as the results of play, are displayed on a video display or otherwise communicated to the player. Symbol carriers may perceptibly rotate about one or more points, translate, or otherwise move as part of the simulation. Further, a player may optionally configure parameters of the game such as symbol order, symbol carrier order, speed, rotation direction, colors, or other characteristics, as well as pay line configurations, prior to initiation of a play sequence.

62 Claims, 8 Drawing Sheets

Pay Lines

| | | |
|---|---|---|
| Pay Line 1 | A, D, F | (304) |
| Pay Line 2 | B, E, G | (306) |
| Pay Line 3 | C, F, H | (308) |
| Pay Line 4 | D, G, A | (310) |
| Pay Line 5 | E, H, B | (312) |
| Pay Line 6 | F, A, C | (314) |
| Pay Line 7 | G, B, D | (316) |
| Pay Line 8 | H, C, E | (318) |
| Pay Line 9 | A, C, E, G | (320) |
| Pay Line 10 | B, D, F, H | (322) |

Eight Pointed Spinner Symbols

Number Seven
Single Bar
Double Bars
Triple Bars
Cherry
Orange
Grape
Lemon

METHOD AND APPARATUS FOR GAMING USING SYMBOLS MOVABLE IN THE PLANE OF A DISPLAY

BACKGROUND OF THE INVENTION

1. Field of the Invention

This invention relates generally to games of chance. More specifically, the invention relates to a gaming method and apparatus for substantially simultaneously displaying multiple symbol carriers, each bearing a plurality of symbols used as elements of wagering on a game of chance and, through translational movement in the plane of a game display of the symbol carriers, associated indicators or both, displaying a visual representation of operation of the game of chance and an outcome thereof.

2. State of the Art

Gaming machines have been a significant facet of the gaming industry. One of the most basic implementations of a gaming machine is a mechanical or electromechanical device having a plurality of independently spinning reels, known in the art as a "slot" machine. In recent years, similar gaming machines using a random number generator and programmed to display a video simulation of spinning reels including an outcome simulative of an end result of actual physical reel spins have taken an ever-increasing market share. During typical operation, the player wagers an amount and initiates spinning of a set of reels (or simulation thereof) displaying symbols on their outer surface. At the conclusion of rotation, the reels are stopped at random positions with certain symbols aligned along predetermined paths commonly termed "pay lines." If a predetermined combination of symbols appears in alignment along a pay line when the reels stop, the player is awarded a payout amount that is substantially proportional to the probability of the occurrence of the symbol combination. Thus, higher payouts are generally offered by gaming machines set for a low probability of generating a winning outcome.

Further, the gaming market has recognized a demand for ever-higher possible payoffs in order to stimulate and maintain appeal for players. In addition, it has been recognized that gaming devices which provide different modes of operation and different gaming experiences are desirable to attract players. In response, gaming machines have evolved to provide games offering relatively high payoffs and to also provide a variety of gaming experiences.

One possible recognized way to increase the available payoffs for play of a symbol alignment game while maintaining payout percentages is to increase the number of combinations available by way of the symbols and/or reels. Thus, mechanical reel-type slot machines have been modified by the addition of reels and an increase of the number of symbols on reels to increase the number of combinations of symbols, thus increasing the possible maximum payoff. Additional reels may be used to increase the maximum available payoff by reducing the probability of a maximum payoff event through adding to the number of symbols required for a winning pay line. Likewise, the addition of more symbols to reels also lowers the odds of a winning combination along a pay line and thus permits an increase in the possible maximum payoff. Many physical changes to typical mechanical reel-type symbol alignment gaming machines have resulted in an overall increase in the size of the gaming machine. Unfortunately, players often perceive physically larger machines as being less likely to produce a winning result.

Other approaches for expanding the available odds of gaming machines and providing enhanced player enjoyment have been contemplated. For instance, U.S. Pat. No. 6,105,962 to Malavazos et al. teaches a gaming apparatus comprised of a series of rotating disks having annular bands of symbols on different diameters. Also, U.S. Pat. No. 5,752,881 to Inoue describes an inventive gaming machine wherein an outer transparent reel contains an inner reel, thus allowing for the two reels to form a combined or compound symbol that is used to determine winning symbol configurations.

Electronic video display gaming machines have also expanded the breadth of available winning combinations for symbol alignment gaming without increasing the overall size of the gaming machine. Electronic gaming machines produce randomness in the game, as noted above, through the use of a random number generator or pseudo-random number generator, unlike the physical slot machines, where the ending rotational position of any reel is determined by physical factors such as starting position, initial velocity, friction, as well as other factors. Also, electronic gaming machines are much easier to modify with respect to a game as implemented and displayed because the physical gears, wheels, and mechanical workings of physical gaming machines are absent.

In addition, video display gaming machines have been used to provide alternative games and gaming concepts. For instance, U.S. Pat. No. 6,168,520 to Baerlocher et al. teaches a wheel of fortune game wherein a slot-like game is combined with a bonus wheel hierarchy for winning a bonus or progressive prize. First, a slot-like game is played with five reels, and if three or more "wheel" symbols are present on any active pay lines, bonus play is initiated through a series of wheels that may be successively spun, depending on the outcome of the previous wheel.

U.S. Pat. No. 6,241,607 to Payne et al. describes a gaming method and apparatus wherein a multiplicity of independently driven symbol—carrying elements are arranged in a nonorthogonal array and are combined with a plurality of selectable pay lines for determining winning events.

However, it would be desirable to provide other, different electronic symbol alignment gaming devices and methods for enhanced enjoyment of players while also providing an opportunity for relatively large maximum payouts.

BRIEF SUMMARY OF THE INVENTION

The various embodiments of the present invention are directed to methods of playing games of chance and gaming devices, also termed "gaming machines" or "gaming apparatus" herein, which may employ a display of symbol carriers each bearing a plurality of symbols used as elements of wagering on a game of chance, and, through rotational movement of the symbol carriers, associated indicators or both, display a visual representation of operation of the game of chance and an outcome thereof.

Stated another way, the present invention may comprise an electronic gaming machine including an associated display of a plurality of symbol carriers, each symbol carrier bearing a plurality of symbols, with at least one symbol of each symbol carrier to be used in combination with at least one other symbol of at least one other symbol carrier for determining winning outcomes. All of the symbols of each symbol carrier may be substantially continuously visible to the player during play of the game and a visual representation of operation of the game may be effected by rotational movement of the symbol carriers, associated indicators or both, the rotational movement being effected about axes transverse to a plane of the display so that the symbols on the symbol carriers may remain visible during rotation of the carriers or indicators. Optionally, and for added entertainment value, the symbol carriers themselves may be displayed as rotating as a group about a central axis transverse to the plane of the display in Ferris Wheel fashion.

In the present invention, individual symbol carriers as displayed are configured to bear more than one symbol, with at least one symbol per carrier being designated as a symbol for use in combination with other symbols in determining winning events and payouts. Upon initiation of play, a symbol configuration is generated by, for example, a random number generator and the symbol carriers are then caused to appear on the display to oscillate, transform, or otherwise move to randomly change the positions of available symbols borne by the symbol carrier to simulate physical movement of the symbol carriers for a player. Therefore, selection and simulation of the symbols may be accomplished by any number of methods. For instance, the symbols may be arranged in a geometrical relationship, and the geometrical relationship then may be translated, rotated, or otherwise perceptibly moved during play of the game to display the selected symbol in a predetermined position for use in determining winning outcomes and payouts. Alternatively, a rotational destination of a perceptibly movable indicator such as a pointer may be determined by way of a random number generator to indicate a selected symbol from among a number of fixed symbols displayed on a rotationally fixed symbol carrier. During play or simulation of play, the indicator may oscillate, fluctuate, or otherwise be perceptibly reoriented or moved in a direction during play, and then stopped to indicate the selected symbol of the symbol carrier to be used to determine winning outcomes and payouts. Of course, both a symbol carrier and associated carrier may be displayed as rotating, either in counter-rotational fashion, or in the same direction but at different rates or speeds of rotation.

Significantly, regardless of a method employed to randomly choose the selected symbol of any symbol carrier, all possible symbols as well as the ultimately selected symbol may be substantially continuously visible to the player. In contrast, conventional electronic and mechanical slot-type gaming devices cause one or more symbols to be concealed during play. For instance, a typical mechanical or electromechanical reel gaming machine displays one or more symbols along at least one pay line, but the cylindrical reel conceals at least those symbols that are on the opposite side of the reel of the pay line and usually far more symbols along the reel circumference. Simply put, in a typical mechanical or electromechanical gaming machine, the symbols on the side of the reel cylinder opposite the pay line are facing away from the player. Other electronic video display slot-type gaming machines also “conceal” symbols during play sequences due to the limited circumference of the simulated reels available for display on a video screen. The present invention, in contrast, may provide continuously visible symbols and symbol selection information to the player during play. Of course, if desired, a portion of any symbol carrier may be masked from view, and the invention is not limited to only symbol carriers with completely and continuously revealed groups of symbols.

In addition, prior to inception of play but after a wager has been placed by the player, the present invention may provide a player with the opportunity to modify characteristics of the organization of the symbols on a symbol carrier or carriers as well as the relative organization of the symbol carriers prior to play. As an example, a player may be able to configure the relative spatial organization and orientation of symbol carriers prior to play. The player may use menus, analog joysticks, buttons, a touch screen or other input devices to effect such configuration.

Further, the player may be offered the opportunity to organize the order of the symbols borne by a symbol carrier prior to play. In addition, a possible pool of symbols may be provided, and the player may choose from the available pool of symbols to configure one or more symbol carriers. Symbol configurations that suggest a “theme” may also be provided to enhance the player’s enjoyment of the gaming device. In combination with or as an alternative to symbol or symbol carrier configuration capabilities, the player may also be provided a capability to alter or configure pay lines. Available symbol identities and placement as well as symbol carrier organizational configurations and pay line configurations may also be made responsive to the type of wager proffered by the player, and a higher wager may be rewarded with a higher level of perceived player control.

In play of the game of the present invention, the player may initiate a play sequence where the symbols of each symbol carrier are visually indicated throughout the sequence of play. A play sequence as used herein may be described as encompassing the elapsed time between the beginning of the random selection process of a symbol of each symbol carrier and visual communication of the end result of the random selection process to the player. Play sequences may be accompanied by a visual representation or simulation of the random selection process. As such, each symbol carrier and associated symbols (or associated indicators) may independently translate, rotate, or otherwise change position during a play sequence.

To explain the game of the present invention and exemplary apparatus for implementing same, the game may be implemented using mathematics already developed for, for example, a conventional reel-type gaming machine. In the game of the present invention, however, each reel of a slot machine is represented by a symbol carrier. The probability of each symbol landing on, or being associated with, a given pay line is randomly determined according to a set (and regulatory agency approved, as may be required) pay table, which guarantees a minimum required payout. Translational movement of the symbol carriers as a group may be for visual effect only or, if more than one group of symbol carriers or a group surrounding a central symbol carrier is employed to offer additional and diverse pay lines as is described below, symbol carrier translational movement may be employed as part of the game architecture and the mathematics adjusted accordingly.

As used herein, the term “game of chance” includes and encompasses not only games having a random or arbitrary outcome, but also such games which also invite or require some player input to the game having at least a potential for affecting a game outcome. Such player input is generally termed “skill” whether or not such input is in actuality beneficial in terms of game outcome.

The foregoing and other features and advantages of the invention will become more readily apparent from the following detailed description of the preferred embodiments, which proceeds with reference to the drawings appended hereto.

DETAILED DESCRIPTION OF THE ILLUSTRATED EMBODIMENTS

Figure 1:
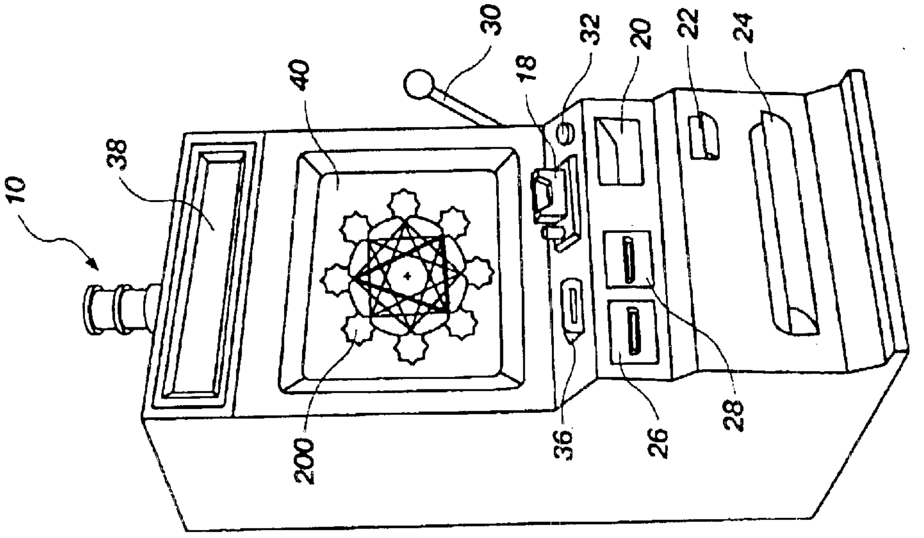
FIG. 1 is a perspective illustration of an exemplary gaming device which may be used to implement the present invention.

FIG. 1 illustrates an exemplary gaming device 10 which may be employed for play of games according to the present invention. The gaming device 10 is configured as a conventional "slot machine", although the physical appearance of the machine housing and the illustrated features thereof are not intended as limiting of the present invention. For example, the present invention may be implemented on one or more remote terminals linked to a centrally or peripherally located server, in the arrangement of a local area network (LAN), a wide area network (WAN) or even a secure real-time Internet or wireless connection.

Figure 2:
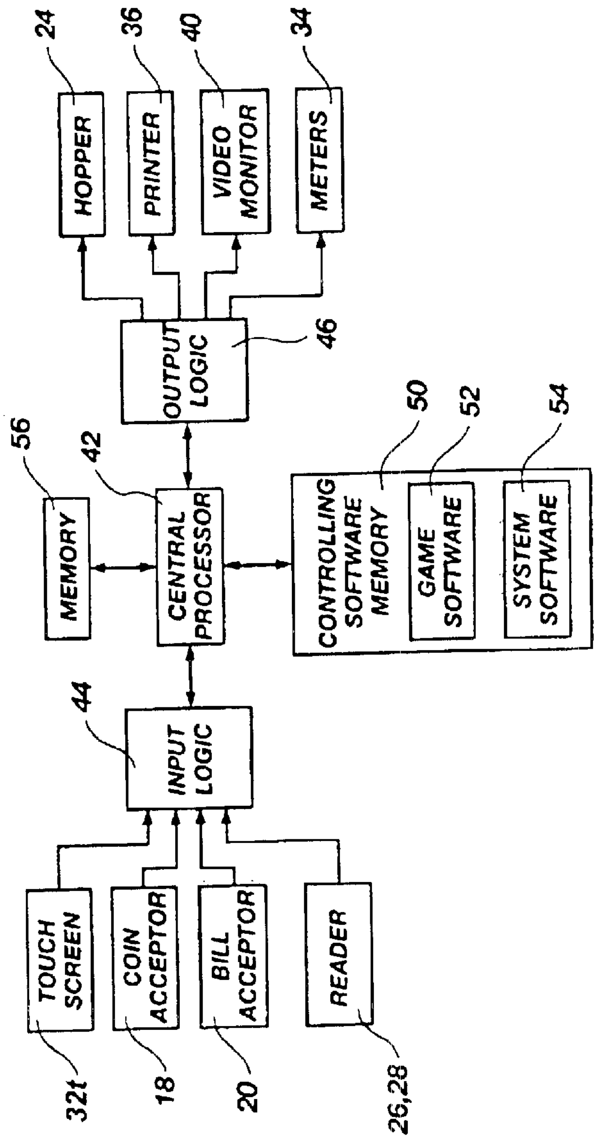
FIG. 2 is a block diagram of components which may be used in the gaming device of FIG. 1.
Figure 2A:
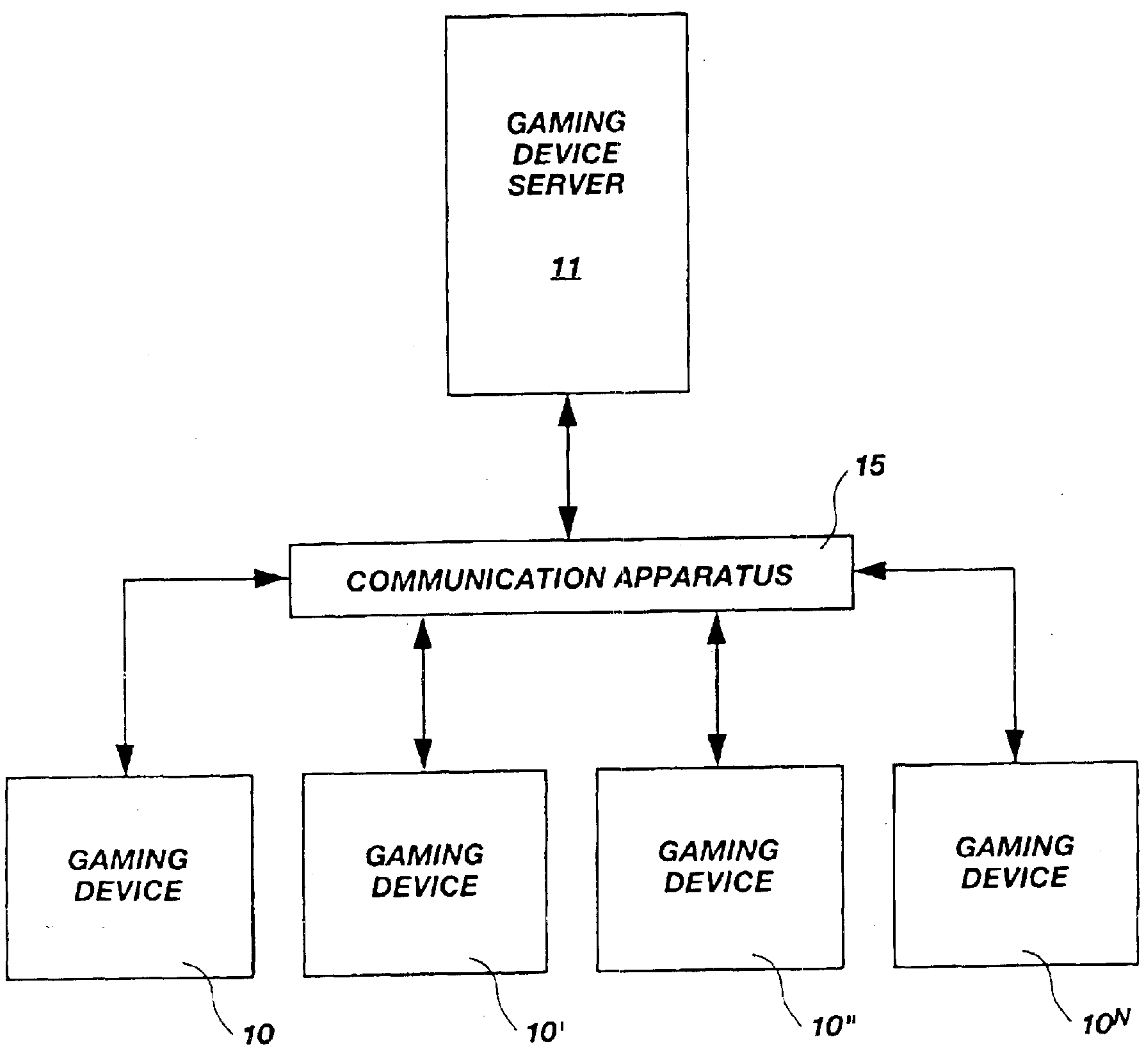
FIG. 2A is a schematic showing a plurality of networked gaming devices linked to another, central or otherwise remote gaming device for implementing one embodiment of the present invention.

FIG. 2A shows a networked, centrally configured gaming system of the present invention. The results of a play sequence may be forwarded to the centrally or peripherally located gaming device server 11 by each remote gaming device 10 for player tracking, accounting or other processing. Communication apparatus 15, as shown in FIG. 2A, between each player's gaming device 10', 10", 10$^N$ and the centrally or peripherally located gaming device server 11 may be effectuated, for example, by use of communication links known in the art. The communication apparatus may be tied to a casino intranet system, such as LAN, or through use of a multi-property WAN. It is also contemplated that secure, such as encrypted, Internet or wireless communication may be employed. The results (data) of a play sequence of a gaming device 10 may be transmitted to gaming device server 11 in the form of one or more symbol carrier configurations via a communication link or links of communication apparatus 15, while being compared by gaming device 10 against preselected criteria for a winning combination of symbols. One of ordinary skill in the art will appreciate that the centrally or peripherally located gaming device server 11 may alternatively be used to generate random symbol configurations for transmission to gaming devices 10', 10", 10$^N$, etc., which may be configured as "dummy" terminals with limited electronic capabilities. Such a network configuration may be particularly suitable when gaming devices 10', 10", 10$^N$, etc. are configured as personal digital assistants or other hand-held devices to be used in casino bars, lounges and outdoor recreation areas by patrons.

Turning again to FIG. 1, gaming device 10 includes a display device in the form of a video monitor 40, which is configured for a visually perceptible matrix display of a plurality of symbols which may comprise, by way of example only and as known in the art, numbers, bars, fruit, medallions, stars and the like. Video monitor 40 may comprise an electronic video display such as a cathode ray tube (CRT) display, plasma display, field emission display (FED), liquid crystal display (LCD) or other suitable electronic video display known in the art. In an electronic video display implementation, the symbols, their identity, selection and configuration for display on the matrix display may be determined conventionally by a random number generator, while the visually perceptible "movement" thereof on the video monitor 40 may be determined conventionally by software driving and controlling the video monitor 40. Alternatively, the display device may comprise electromechanically controlled symbol carriers, also as known in the art. In the case of electromechanical gaming apparatus, mechanical spinning devices and arresting mechanisms are well known in the art, in the form of reel driver boards and rotatably driven shafts with encoders or other sensors.

Gaming device 10 may further include a coin acceptor 18 for receiving a wager in the form of one or more coins or tokens, a paper currency (bill) acceptor 20 including a bill validator, a change return 22 and a hopper 24 for rendering payouts in the form of coins or tokens. A player tracking card reader 26 and a credit/debit card reader 28 may also be included, as desired. A handle 30 or one or more buttons 32 may also be employed as initiator elements to initiate a game according to the present invention once a wager has been placed. Buttons 32 may comprise actual physical elements or the buttons may (as shown in FIG. 2) comprise one or more portions **32*t* of a "touch" screen display responsive to contact thereof by the player. Gaming device 10 may also incorporate one or more meter displays 34 (see FIG. 2), for example, displaying the amount of winnings, credit available for wagering, the number of plays accumulated, the number of symbol selections available, etc., and a printer 36 for generating a physical record of an award. Pay tables, attract sequences, or other game-associated information may also be displayed, as above video monitor 40, at 38**, which may comprise a conventional illuminated glass or another video monitor, as known in the art.

Referring to FIG. 2, gaming device 10 may be provided with a central processor (CPU) 42 operably coupled to input logic circuitry 44 and output logic circuitry 46. Input logic circuitry 44 is employed to operably couple CPU 42 to input devices such as, for example, a touch screen segment **32*t* or physical button 32, coin acceptor 18, bill acceptor 20, player tracking card reader 26 or credit/debit card reader 28. Output logic circuitry 46 is employed to operably couple CPU 42 with output devices such as, for example, hopper 24, video monitor 40, meter displays 34 and printer 36. Video monitor 40** may, as previously noted, comprise a video display of any suitable type.

CPU 42 is also operably coupled to controlling software memory 50, which includes assigned memory locations storing game software 52 and system software 54. Such controlling software memory 50 dictates when selected graphics or messages are displayed to a player, as well as when play sequences begin and end and management of wager input and award output. CPU 42 is also operably coupled to a second memory 56, which is employed to store data indicative of game statistics, number of plays, number of wins, etc. Controlling software memory 50, second memory 56, or other, ancillary memory (not shown) may be used to store data indicative of winning results, such as data representative of one or more symbol combinations, including winning combinations. Second memory 56 may also be used, for example, to store a bit map of the symbol pattern depicted as a matrix display on video monitor 40.

As used herein, the term "gaming apparatus" contemplates and encompasses the operational portion of a gaming device for enabling, initiating and controlling the course of a game as well as components thereof, all as described above. A display or video monitor may be included within the term "gaming apparatus," although such may be a separate component therefrom.

Figure 3:
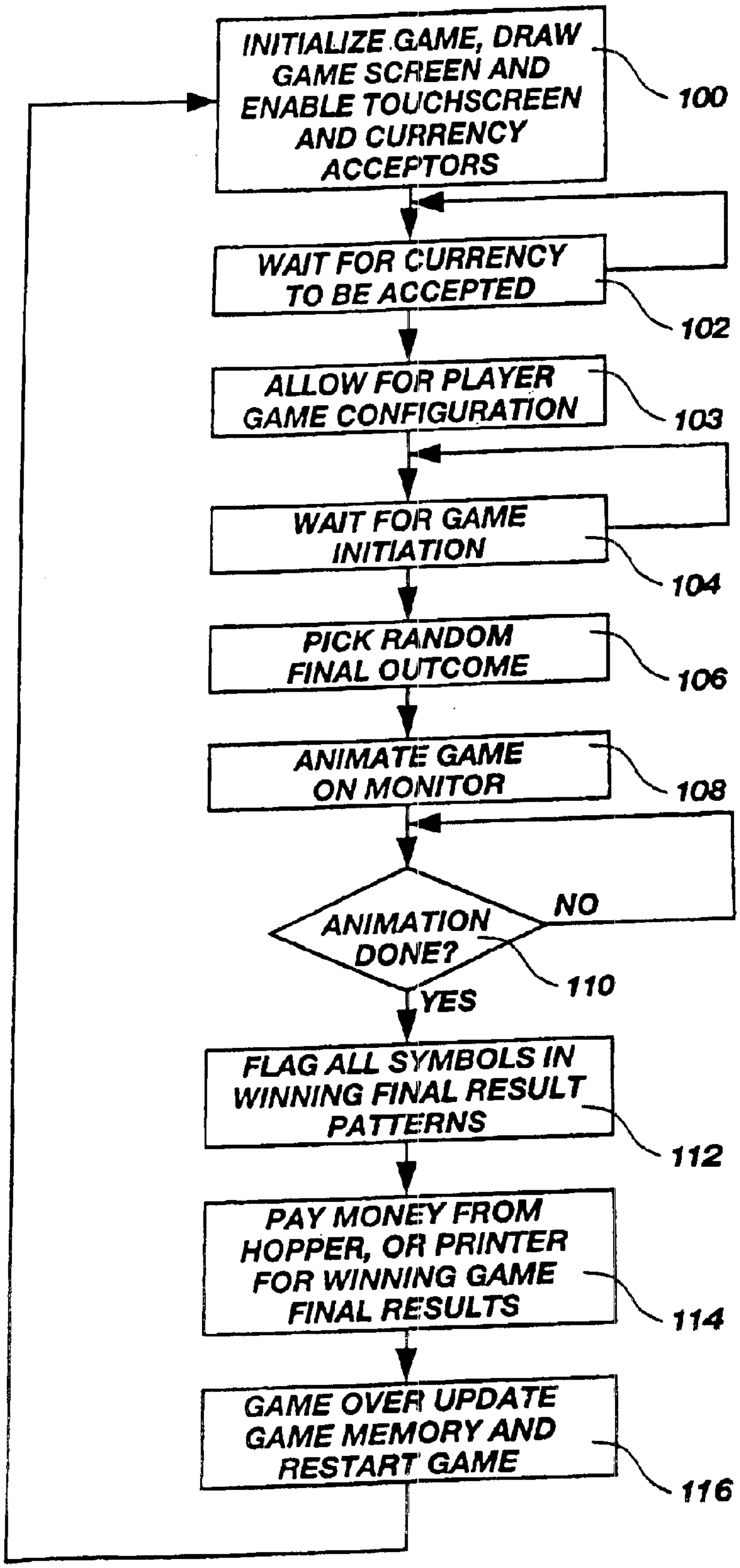
FIG. 3 is a block diagram illustrating an embodiment of the operation of a gaming device of the present invention.

Referring now to FIG. 3, the general operation of exemplary gaming device 10 will be described, including the operation of CPU 42 in combination with game software 52 and system software 54. Gaming device 10 is initialized at 100, as by a casino operator, responsive to which CPU 42 carries out instructions of system software 54 to implement an initial display pattern on video monitor 40 and to enable the input devices as previously mentioned. Gaming device 10 then remains in a passive or waiting state 102 until currency or the equivalent is input for a wager (for example, through the use of a credit card, debit card or player tracking card carrying a credit balance) and is validated by CPU 42 by way of the bill validator of bill acceptor 20, player tracking card reader 26 or debit/credit card reader 28. Then, if the game software affords such features, the player may be enabled to configure certain characteristics of the game, such as positions and orientations of symbols, symbol carriers and pay lines 103. After a wager is received and the game configured (if applicable), gaming machine 10 is placed in a ready state 104 until a player activates an initiator element such as handle 30, physical button 32 or touch screen **32*t* to initiate a play sequence. At this point, the game software 52, in conjunction with a random number generator as known in the art, generates a random symbol configuration at 106 for a random final outcome comprised of a pattern of symbols for depiction on video monitor 40, as known in the art. System software 54 then animates the video monitor 40 at 108 by simulating the movement of visible representations of symbol carriers including symbols thereon so that the player perceives symbol carrier rotational "movement" of each symbol carrier as well as, optionally, rotational movement of the entire group of symbol carriers about a common axis. Once the visible representations of the symbol carriers have stopped 110, all of the generated, displayed symbols comprising a winning combination or combinations in the matrix display are identified or flagged 112. Each winning pay line may be, but is not necessarily, flagged on the display with a different color or other common link between all of the symbols included therein. Pay lines with winning combinations of symbols may have a line generated therethrough, the indicia on the winning pay line may be more brightly illuminated, the non-winning indicia reduced in brightness, or the winning combinations otherwise highlighted on the display as known in the art. At the conclusion of a play sequence, a payout may be generated at 114 in association with each winning pay line or combination of winning pay lines. When the game is over, the gaming device 10 resets at 116** for future play.

The manner in which winning combinations of symbols may be determined and flagged is well known in the art. The displayed results (pattern of symbols depicted on video monitor 40), which may include symbols received from a remote location, is compared with data stored in game software 52 representing winning combinations to determine if any displayed combination on an active pay line is a winning combination. Any identified winning combination or combinations of symbols are then associated with winnings to be distributed to the player according to a paytable of the game software 52 associated with the various possible winning combinations. Thus, in the context of the present invention, the various pay line configurations and required combinations of the various indicia for a winning combination within each pay line reside within game software 52 and are retrieved for comparison to the randomly generated pattern of indicia depicted on video monitor 40.

Figure 4:
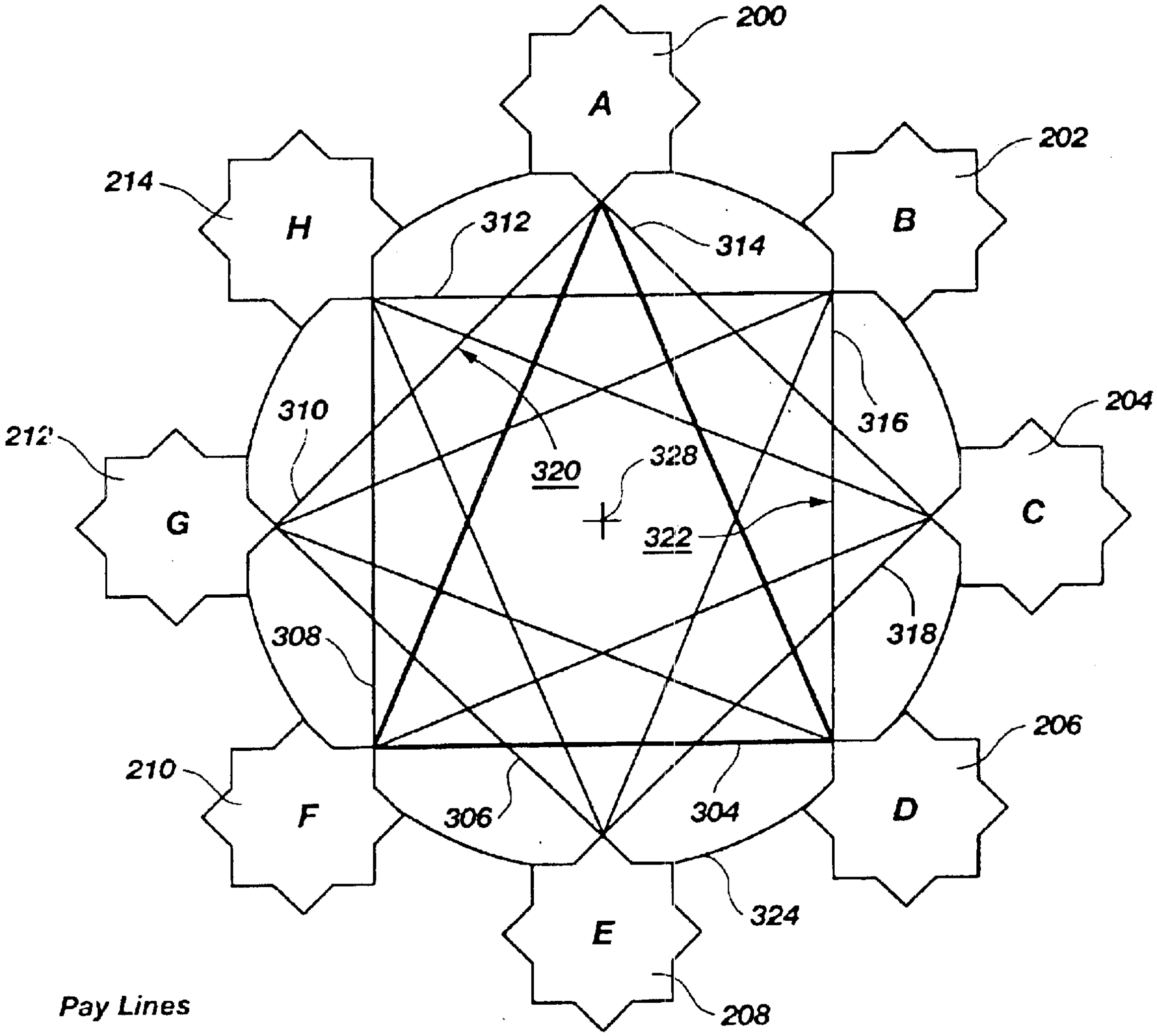
FIG. 4 is an illustration of the operation of the gaming device of the present invention.
Figure 5:
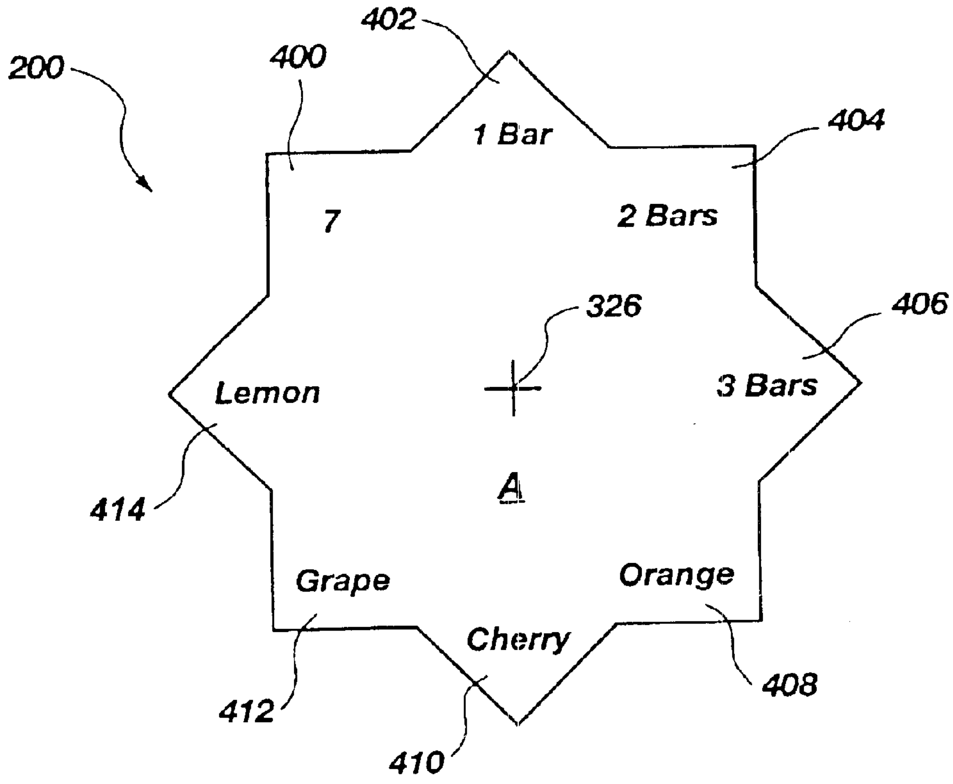
FIG. 5 is an illustration of the symbol carrier of FIG. 4.

Turning to the specific game aspects of the present invention, FIG. 4 and FIG. 5 show individual symbol carriers A 200, B 202, C 204, D 206, E 208, F 210, G 212, and H 214 that are each configured to bear more than one symbol. Symbols 400, 402, 404, 406, 408, 410, 412, and 414 are shown on an exemplary symbol carrier A 200 in FIG. 5. In this embodiment, the randomly selected or "chosen" symbol for determining winning events is the symbol which comes to rest at the end of a play sequence in a position that is attached to, or proximate an apex of, a nonlinear, geometrically shaped pay line. For instance, symbol carrier A 200 is attached to the pay line 1 (304), pay line 4 (310), pay line 6 (314), and pay line 9 (320); a table of exemplary pay lines 1 through 9 and their respectively attached symbol carriers A through H is set forth in FIG. 4 for clarity. During a play sequence, each individual symbol carrier such as symbol carrier A 200 may rotate about its center 326. Also, all symbol carriers may rotate as a group about the symbol carrier configuration center 328. Therefore, each symbol designated as the chosen symbol of each symbol carrier A 200 through H 214 used to determine winning events and payouts in this embodiment is the symbol connected to a pay line structure at the end of a play sequence. Thus, in this embodiment, connections between pay lines and symbol carriers serve as independent and distinct chosen symbol indicators for each of the symbol carriers A through H, respectively designated as 200, 202, 204, 206, 208, 210, 212, and 214. Pay lines 1 through 9, respectively designated as 304, 306, 308, 310, 312, 314, 316, 318, 320, and 322, shown in FIG. 4, each extend to either three or four symbol carriers arranged in a geometrical combination as shown by the lines between the respective symbol carriers and as compiled in the table comprising a a portion of FIG. 4. Upon a wager being placed by the player, at least one pay line is activated. An additional wager or wagers may cause an additional pay line or pay lines to be activated.

Figure 6A:
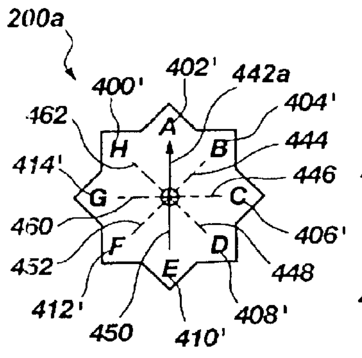
FIGS. 6A–6F are illustrations of different symbol carriers incorporating teachings of the present invention.

Alternative symbol carriers and chosen symbol indicators are shown in FIGS. 6A–6F. FIG. 6A shows a symbol carrier **200*a* bearing symbols 400', 402', 404', 406', 408', 410', 412', and 414'. Chosen symbol indicator 442*a* is depicted as a pointer, pointing at symbol 402', but may point to any of the other symbols along axes 444, 446, 448, 450, 452, 460, or 462. During a play sequence, chosen symbol indicator 442*a* may rotate or otherwise change orientation among the available symbols 400' through 414' present to indicate a chosen symbol. Symbol carrier 200*a* may remain rotationally stationary, or may itself rotate either in the same direction or counter to rotation of chosen symbol indicator 442*a*. Rotational speeds of symbol carrier 200*a* and of chosen symbol indicator 442*a* may differ as well. Significantly, all symbols 400' through 414'** may be continuously visible to a player during a play sequence.

Figure 6B:
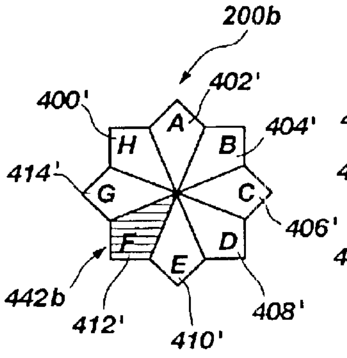

FIG. 6B shows a symbol carrier **200*b* bearing symbols 400' through 414' wherein each symbol is separated into a compartment or segment of the symbol carrier 200*b*. Further, the chosen symbol indicator 442*b* is simply a color that fills or otherwise emphasizes the compartment of the selected symbol as, for example, by illuminating same. Symbol 412' is shown as being the selected symbol, because its compartment is highlighted or otherwise accentuated to convey symbol 412' as the selected symbol of symbol carrier 200***b*. Alternative chosen symbol indicators include emphasized borders, emphasized (bolded) symbols, flashing symbols, color changes, animated sequences, or other visible indications. Also, chosen symbol indicators may change, oscillate, or alter during a play sequence or series of play sequences to enhance player enjoyment and provide new and exciting gaming experiences.

Figure 6C:
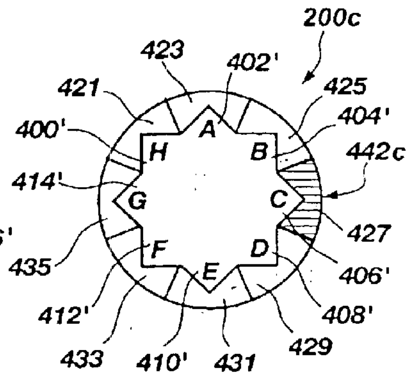

FIG. 6C shows yet another symbol carrier 200*c* with a different chosen symbol indicator 442*c*. Symbol carrier 200*c* is configured with eight symbols 400' through 414' and is shaped about its outer periphery as a circle with its inner periphery forming eight congruent indentations one for each symbol. In addition, evenly-spaced radially extending lines divide the area between the outer and inner periphery into eight smaller areas, 421, 423, 425, 427, 429, 431, 433, and 435. Symbol 406' is depicted as the selected symbol, with the area 427 between the outer and inner periphery being highlighted or otherwise accentuated to indicate the selected symbol.

Figure 6D:
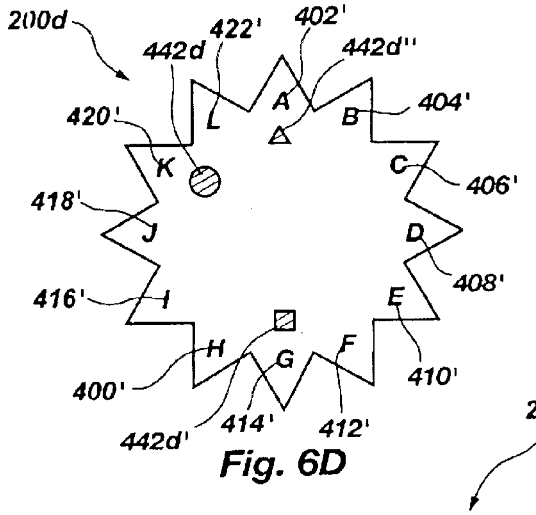

In addition, a symbol carrier may display more than one selected symbol. For instance, different shapes or colors of chosen symbol indicators may be used to provide chosen symbols for any number of pay line configurations. Therefore, symbol carriers may comprise more than one chosen symbol indicator, as shown in FIG. 6D. Chosen symbol indicators 442*d*, 442*d'*, and 442*d''*, respectively shown as a circle, square, and triangle, indicate different chosen symbols within the same symbol carrier 200*d*. Thus, in the pay line configuration shown in FIG. 5, each pay line may be associated with one or more chosen symbol indicators. Also, symbol carrier 200*d* of FIG. 6D illustrates a symbol carrier bearing symbols 402' through 422'. Symbol carriers are not limited in geometry or number of symbols that they may bear. However, all symbols borne by each symbol carrier may be continuously visible to the player during a play sequence. Furthermore, chosen symbol indicators may be mutually exclusive, thus precluding another chosen symbol indicator associated with a given symbol carrier from selecting the same symbol thereon. Alternatively, chosen symbol indicators may be mutually inclusive, thus allowing for one symbol on a symbol carrier to be selected by more than one chosen symbol indicator associated with that symbol carrier. The positions and number of multiple chosen symbol indicators, if permitted by the game architecture, may be determined by corresponding randomly generated events. Such flexibility allows for expanded pay line configurations as well as higher maximum payouts due to increased possible symbol combinations.

During a play sequence, the chosen symbol indicators may oscillate, transform, or otherwise change the potential selected symbol between the available symbols within the symbol carrier. In FIG. 6D, where chosen symbol indicators 442, 442', and 442'' are shapes, the shapes may simply be displayed to "bounce" around the inner periphery of a stationary or rotating symbol carrier during a play sequence until coming to rest in a bin associated with a given symbol, similar in motion to the ball of a roulette wheel. The present invention is not limited to any one method of altering the chosen symbol of any symbol carrier.

Figure 6E:
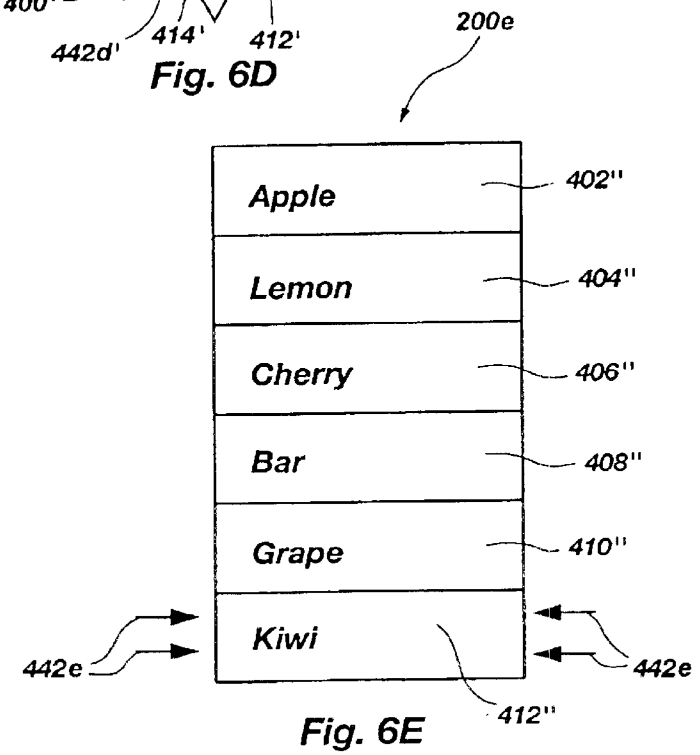
Figure 6F:
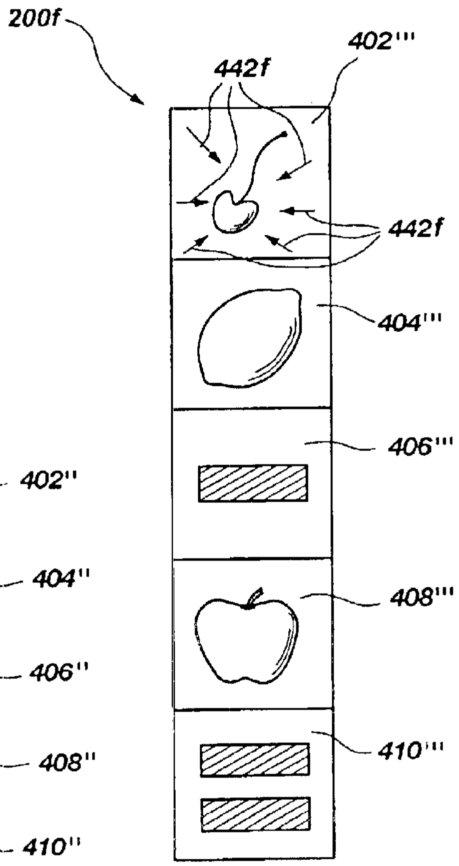

FIGS. 6E and 6F illustrate other embodiments for chosen symbol indication. FIG. 6E shows a columnar organization for exemplary text symbols 402'', 404'', 406'', 408'', 410'', and 412''. Chosen symbol indicators 442*e* in the form of arrows are located outside of the periphery of the symbol carrier 200*e* to indicate the chosen symbol 412''. Similarly, FIG. 6F shows a columnar arrangement for symbols 402''', 404''', 406''', 408''', and 410''', where the symbols are graphic representations. In addition, chosen symbol indicators 442*f* comprise one or more flashing arrows appearing on the inside of the symbol carrier 200*f* to indicate the selected symbol 402'''.

Because each symbol carrier and chosen symbol is independent of other symbol carriers and respective symbols, player configuration of symbol carriers and/or symbols may be possible. For instance, a player might arrange or rearrange symbol carriers on a display prior to play, or rotationally orient symbol carriers prior to a play sequence. Additionally, the player may be able to vary a direction or speed of movement of symbol carriers and/or symbols prior to display of a play sequence. The ability to configure the game prior to a play sequence may provide players with an enhanced gaming experience.

Referring again to FIG. 4, during a play sequence, the gaming device 10 determines a symbol configuration and then animates or simulates the function of the game. In the embodiment shown in FIG. 4, each individual symbol carrier rotates about its own center 326 (shown in FIG. 5). Further, all symbol carriers may be caused to rotate about the symbol carrier configuration center 328, thus moving around the periphery of circle 324. Thus, the player may enjoy full visibility of all symbols borne by each symbol carrier 200, 202, 204, 206, 208, 210, 212, and 214 during a play sequence. Furthermore, each chosen symbol indicator of each symbol carrier is independent and distinct from one another as each symbol carrier is distinctly and independently connected to the pay line structure at one point. However, and as noted previously, alternate pay line structures are possible wherein multiple symbols of a single symbol carrier may be selected as chosen symbols used to determine winning events. The present invention is not limited to any one pay line structure.

Figure 7:
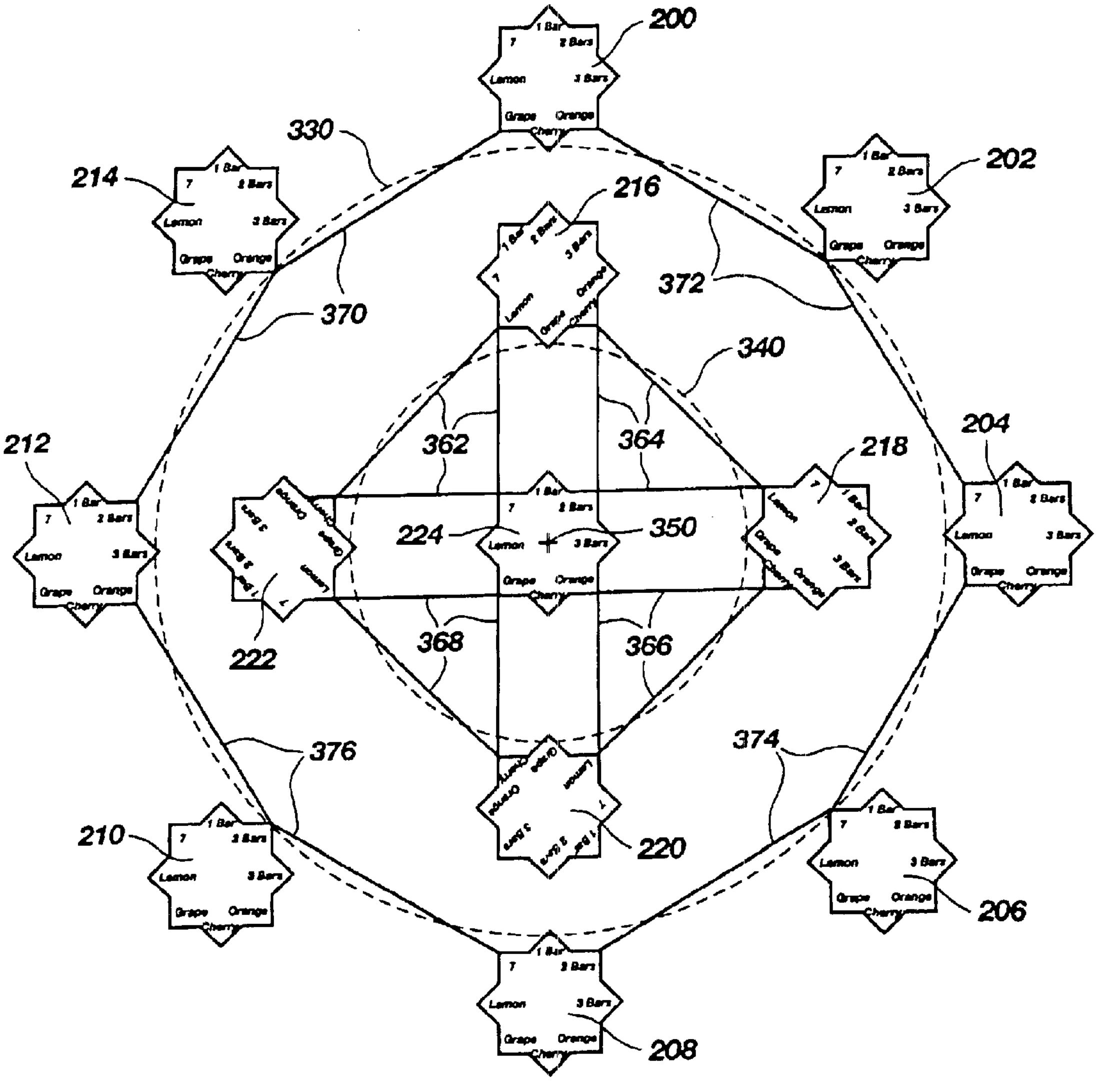
FIG. 7 is an illustration of the operation of another embodiment of the gaming device of the present invention.

FIG. 7 illustrates another embodiment incorporating teachings of the present invention. Similar to FIG. 4, a first set of symbol carriers 200, 202, 204, 206, 208, 210, 212, and 214 is positioned around the periphery of a first circle 330. In addition, a second set of symbol carriers 216, 218, 220, and 222 is positioned about the periphery of a second circle 340. First and second circles 330 and 340 are coaxial about center point 350. Symbol carrier 224 is positioned at the center of the symbol carrier configuration. Upon a player initiating a play sequence, and upon simulation of the play sequence on a display, the first set of symbol carriers 200 through 214 may rotate clockwise or counter clockwise about center point 350, or not at all. Similarly, the second set of symbol carriers 216 through 222 may rotate clockwise or counterclockwise or not at all. However, every symbol carrier rotates about its own center in order to position the determined chosen symbol with respect to a given pay line.

Pay lines 362, 364, 366, 368, 370, 372, 374, and 376 determine winning outcomes. For instance, the triangle formed by the pay line 368 connects symbol carrier 222, symbol carrier 220 and symbol carrier 224. At each connection, the chosen symbol is determined for each symbol carrier with respect to pay line 368. Pay lines 362, 364, and 366 operate similarly. Notably, symbol carrier 224 carries four chosen symbols respectively associated with four different pay lines. In addition, pay line 370 determines a winning event for the selected symbols of symbol carriers 212, 214, and 200. Pay lines 372, 374, and 376 are configured similarly to pay line 370. Also, notably, symbol carriers 200, 204, 208 and 212 each contain two chosen symbols. Furthermore, the combination of pay lines 370, 372, 374 and 376 may determine a super jackpot pay line.

Although the first and second sets of symbol carriers have been depicted as moving in a circular fashion, other motions are contemplated by the present invention and are easily implemented using a video display. For instance, a symbol carrier may exchange positions with another symbol carrier, or otherwise change positions in addition to rotation or other movement. However, each symbol borne by each symbol carrier may still be made continuously visible to the player during a play sequence. Further, each symbol carrier has associated therewith at least one independent and distinct indicator indicating at least one chosen symbol thereof.

Figure 8:
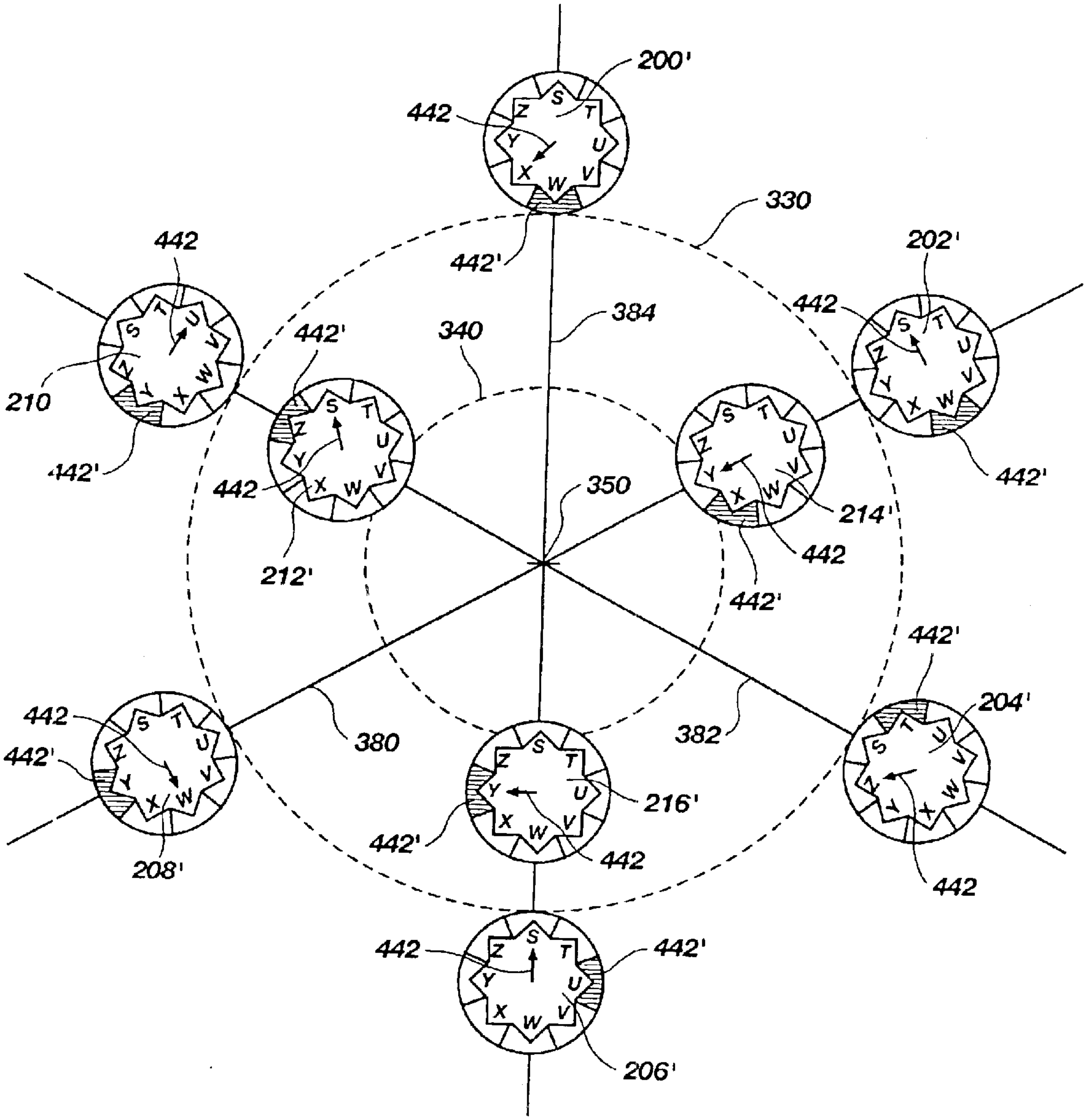
FIG. 8 is an illustration of the operation of another embodiment of the gaming device of the present invention.

FIG. 8 shows another embodiment of symbol alignment gaming incorporating the teachings of the present invention. Symbol carriers 200', 202', 204', 206', 208', and 210' are positioned around the outer periphery of first circle 330. Symbol carriers 212', 214', 216' are positioned around the outer periphery of second circle 340. First and second circles 330 and 340 are coaxial about center point 350. As with the embodiment of FIG. 7, the symbol carriers of each group may rotate about center point 350, as desired. In this embodiment, connection between the pay line and the symbol carrier does not coincide with the chosen symbol(s). Symbol carriers similar to the symbol carrier shown in FIG. 6C are shown. However, each symbol carrier of FIG. 8 contains two mutually inclusive, independent, chosen symbol indicators, 442 and 442'. Also, three lines 380, 382, and 384 define the pay lines in this embodiment. By way of illustration, pay line 380 intersects symbol carriers 208', 214', and 202'. Each chosen symbol indicated by way of chosen symbol indicators 442 of symbol carriers 208', 214', and 202' make up one combination along pay line 380. In addition, each chosen symbol indicated by way of chosen symbol indicators 442' of symbol carriers 208', 214', and 202' make up a second combination along pay line 380. Therefore, the number of chosen symbol indicators per symbol carrier determines the number of different combinations that may be created along a pay line via a combination of symbol carrier(s) in this embodiment.

As noted previously, chosen symbol indicators may comprise arrows, symbol highlighting, symbol coloring, marking, secondary symbol marking, shading, or any other visible characteristics indicating that a symbol is chosen with respect to the respective indicator.

The present invention has been described herein with respect to play of a primary or base game. However, it may also be implemented in the context of a bonus game wherein some or all combinations randomly generated may be winning combinations to augment, multiply or otherwise respond to a preselected outcome of an associated base game. In such an instance, the present invention may be implemented as a so-called "top box" over a conventional gaming machine configured for primary game play, as known in the art. Similarly, if implemented in the context of a bonus game, the present invention may be configured as a progressive using a plurality of networked gaming machines, again as known in the art. In addition, either in the context of a base game or a bonus game, a plurality of cooperative gaming machines, each employing one symbol carrier and associated indicator and carrier, may be linked in various combinations with a server as illustrated in FIG. 2A of the drawings to form a plurality of "pay lines," each machine taking a position and function similar to that of a single reel in a conventional reel-type machine. However, a large number of machines in a bank enables linking with, for example, two, three, four or five or more other machines to respectively define three, four, five, six or more symbol pay lines. Awards from the winning "pay lines" would be equally apportioned among the gaming machines linked to form the pay lines in question and a common paytable would be used for all of the linked gaming machines which would function as a single "machine" during linked play. Random symbol selection for the symbol carrier associated with each gaming machine may be generated by the individual gaming machines or centrally by the server.

While the present invention has been described in terms of certain exemplary embodiments, it is not so limited, and those of ordinary skill in the art will readily recognize and appreciate that many additions, deletions and modifications to the embodiments described herein may be made without departing from the scope of the invention as hereinafter claimed.

What is claimed is:

1. A gaming device for playing a game, comprising:

a gaming apparatus configured for randomly generating an arrangement comprising a plurality of symbols selected from a preselected plurality of different symbols and associating a plurality of pay lines, each pay line comprising a plurality of designated symbol positions, with the randomly generated arrangement to determine a game outcome for each pay line; and a display device configured for displaying the randomly generated arrangement of symbols in a display comprising a plurality of mutually spaced apart symbol carriers translationally moving as a group about a central axis substantially transverse to the plane of the display, and each perceptibly and individually rotatable about a separate axis substantially transverse to a plane of the display between an initial stationary position and a final stationary position, each symbol carrier bearing a plurality of symbols, the gaming apparatus configured to control perceived rotation of each of the symbol carriers to place, in the final stationary position, at least one symbol of each symbol carrier at a designated symbol position of at least one pay line of the plurality of pay lines.

2. The gaming device of claim 1, wherein the display device is configured to provide a substantially continuous display of all symbols of each symbol carrier between the initial stationary position and the final stationary position.

3. The gaming device of claim 1, wherein the display device is either a video monitor or an electromechanical display.

4. The gaming device of claim 1, wherein the gaming apparatus is configured to enable alteration of position of at least one symbol on at least one symbol carrier of the plurality.

5. The gaming device of claim 4, wherein the gaming apparatus is configured to enable transposition of at least two symbols on at least one symbol carrier of the plurality.

6. The gaming device of claim 1, wherein the gaming apparatus is configured to enable player selection of at least one symbol for placement on at least one symbol carrier of the plurality.

7. The gaming device of claim 1, wherein the plurality of symbol carriers is divided into at least two groups, at least some pay lines are associated with one of the at least two groups and at least some other pay lines are associated with at least another of the at least two groups.

8. The gaming device of claim 1, wherein the group of symbol carriers is divided into at least two groups such that at least one group and at least another group of the at least two groups of symbol carriers are each arranged at different radii from a central axis substantially transverse to the plane of the display, the gaming apparatus is configured for display of perceptible independent rotation of each of the at least two groups about the central axis, and at least some pay lines are linear and associated with at least one symbol carrier of the at least one group and at least another symbol carrier of the at least another group on the display upon cessation of rotation of the at least two groups of symbol carriers.

9. A gaming device for playing a game, comprising:

a gaming apparatus configured for randomly generating an arrangement comprising a plurality of symbols selected from a preselected plurality of different symbols and associating a plurality of pay lines, each pay line comprising a plurality of designated symbol positions, with the randomly generated arrangement to determine a game outcome for each pay line; and a display device configured for displaying the randomly generated arrangement of symbols in a display comprising a plurality of mutually spaced apart symbol carriers divided into a group of symbol carriers surrounding a centrally located symbol carrier, each perceptibly and individually rotatable about a separate axis substantially transverse to a plane of the display between an initial stationary position and a final stationary position, each symbol carrier bearing a plurality of symbols, the gaming apparatus configured to control perceived rotation of each of the symbol carriers to place, in the final stationary position, at least one symbol of each symbol carrier at a designated symbol position of at least one pay line of the plurality of pay lines, and at least some pay lines being associated with at least two symbol carriers of the group and the centrally located symbol carrier.

10. The gaming device of claim 9, wherein the gaming apparatus is configured to initiate perceptible rotation of the group of symbol carriers about the centrally located symbol carrier.

11. A gaming method, comprising:

randomly generating an arrangement comprising a plurality of symbols selected from a preselected plurality of different symbols and associating a plurality of pay lines, each pay line comprising a plurality of designated symbol positions, with the randomly generated arrangement and determining a game outcome for each pay line; and displaying the randomly generated arrangement of symbols in a display comprising a plurality of mutually spaced apart symbol carriers translationally moving as a group about a central axis substantially transverse to the plane of the display, each perceptibly and individually rotatable about a separate axis substantially transverse to a plane of the display between an initial stationary position and a final stationary position, each symbol carrier bearing a plurality of symbols; and perceptibly rotating each of the symbol carriers to place, in the final stationary position, at least one symbol of each symbol carrier at a designated symbol position of at least one pay line of the plurality of pay lines.

12. The gaming method of claim 11, further comprising dividing the group of symbol carriers into at least two groups and arranging each of at least one group and at least another group of the at least two groups of symbol carriers at different radii from a central axis substantially transverse to the plane of the display and displaying perceptible independent rotation of each of the at least two groups about the central axis, and configuring at least some pay lines as linear and associated with at least one symbol carrier of the at least one group and at least another symbol carrier of the at least another group on the display upon cessation of rotation of the at least two groups.

13. A gaming method, comprising:

randomly generating an arrangement comprising a plurality of symbols selected from a preselected plurality of different symbols and associating a plurality of pay lines, each pay line comprising a plurality of designated symbol positions, with the randomly generated arrangement and determining a game outcome for each pay line; and displaying the randomly generated arrangement of symbols in a display comprising a plurality of mutually spaced apart symbol carriers divided into a group of symbol carriers surrounding a centrally located symbol carrier, each perceptibly and individually rotatable about a separate axis substantially transverse to a plane of the display between an initial stationary position and a final stationary position, each symbol carrier bearing a plurality of symbols; and perceptibly rotating each of the symbol carriers to place, in the final stationary position, at least one symbol of each symbol carrier at a designated symbol position of at least one pay line of the plurality of pay lines and associating at least some pay lines with at least two symbol carriers of the group and the centrally located symbol carrier.

14. The gaming method of claim 13, further comprising initiating perceptible rotation of the group of symbol carriers about the centrally located symbol carrier.

15. A gaming device comprising:

a display device having a plane;

a wager input device; and a central processor operably coupled to the display device, the wager input device, and a memory, the central processor carrying out instructions to receive a wager via the wager input device, the central processor carrying out instructions to cause the display device to display a plurality of spaced apart symbol carriers, each symbol carrier have a plurality of symbols thereon, the central processor carrying out instructions to cause the display device to display relative motion between the plurality of symbols on each of the symbol carriers and at least one associated symbol indicator for each of the symbol carriers, the at least one associated symbol indicator indicating at least one chosen symbol for each of the symbol carriers, the central processor carrying out instructions to cause the display device to display the plurality of spaced apart symbol carriers moving as a group about a central axis substantially transverse to the plane of the display device, the central processor carrying out instructions to cause the display device to display a final display with the relative motion between the plurality of symbols on each symbol carrier and the at least one associated symbol indicator stopped and the motion of the plurality of spaced apart symbol carriers about the central axis stopped, the central processor carrying out instructions to provide a payout associated with the final display.

16. The gaming device according to claim 15, wherein the central processor carries out instructions to cause the display device to display each of the plurality of spaced apart symbol carriers moving about its own symbol carrier central axis substantially transverse to the plane of the display device.

17. The gaming device according to claim 15, wherein the at least one symbol indicator comprises a connection between a payline and at least one of the plurality of spaced apart symbol carriers.

18. The gaming device according to claim 15, wherein each of the symbol carriers has the plurality of symbols arranged about a symbol carrier central axis and the at least one symbol indicator comprises a pointer that moves about the symbol carrier central axis.

19. The gaming device according to claim 15, wherein each of the symbol carriers comprises a plurality of compartments, each compartment having at least one of the plurality of symbols disposed therein, and the at least one symbol indicator comprises a highlighted compartment.

20. The gaming device according to claim 15, wherein the at least one symbol indictor comprises a plurality of areas disposed about the periphery of the each of the symbol carriers, each of the areas associated with one of the plurality of symbols.

21. The gaming device according to claim 15, wherein each of the symbol carriers has a plurality of symbol indicators associated therewith.

22. The gaming device according to claim 21, wherein the at least one symbol indicator comprises at least one pointer disposed adjacent to the symbol carrier periphery.

23. The gaming device according to claim 21, wherein the at least one symbol indicator comprises at least one pointer disposed within the symbol carrier periphery.

24. The gaming device according to claim 15, wherein each of the symbol carriers comprises a column having a plurality of segments, each segment having at least one of the plurality of symbols disposed therein.

25. The gaming device according to claim 15, wherein:

the central processor carries out instructions to randomly determine a game outcome, and the central processor carries out instructions to provide a payout associated with the final display and according to the game outcome.

26. The gaming device according to claim 15, wherein the wager input device comprises at least one of a coin acceptor, a bill acceptor, a credit/debit card reader and a player tracking card reader.

27. The gaming device according to claim 15, wherein the display device comprises at least one of a video monitor and an electromechanical display.

28. A gaming device comprising:

a display device;

a wager input device; and a central processor operably coupled to the display device, the wager input device, and a memory, the central processor carrying out instructions to receive a wager via the wager input device, the central processor carrying out instructions to cause the display device to display a plurality of spaced apart symbol carriers, each symbol carrier having a plurality of symbols thereon, and a plurality of pay lines, the plurality of spaced apart symbol carriers including a centrally located symbol carrier and a group of symbol carriers disposed about the centrally located symbol carrier, and at least some of the plurality of pay lines being associated with at least two symbol carriers of the group of symbol carriers and the central symbol carrier, the central processor carrying out instructions to cause the display device to display relative motion between the plurality of symbols on each of the symbol carriers and at least one associated symbol indicator for each of the symbol carriers, the at least one associated symbol indicator indicating at least one chosen symbol for each of the symbol carriers, the central processor carrying out instructions to cause the display device to display a final display with the relative motion between the symbols on each symbol carrier and the at least one associated symbol indicator stopped, the central processor carrying out instructions to provide a payout associated with the final display.

29. The gaming device according to claim 28, wherein the central processor carries out instructions to cause the display device to display each of the plurality of spaced apart symbol carriers moving about its own symbol carrier central axis substantially transverse to the plane of the display device.

30. The gaming device according to claim 28, wherein the at least one symbol indicator comprises a connection between a payline and at least one of the plurality of spaced apart symbol carriers.

31. The gaming device according to claim 28, wherein each of the symbol carriers has the plurality of symbols arranged about a symbol carrier central axis and the at least one symbol indicator comprises a pointer that moves about the symbol carrier central axis.

32. The gaming device according to claim 28, wherein each of the symbol carriers comprises a plurality of compartments, each compartment having at least one of the plurality of symbols disposed therein, and the at least one symbol indicator comprises a highlighted compartment.

33. The gaming device according to claim 28, wherein the at least one symbol indictor comprises a plurality of areas disposed about the periphery of the each of the symbol carriers, each of the areas associated with one of the plurality of symbols.

34. The gaming device according to claim 28, wherein each of the symbol carriers has a plurality of symbol indicators associated therewith.

35. The gaming device according to claim 28, wherein each of the symbol carriers comprises a column having a plurality of segments, each segment having at least one of the plurality of symbols disposed therein.

36. The gaming device according to claim 35, wherein the at least one symbol indicator comprises at least one pointer disposed adjacent to the symbol carrier periphery.

37. The gaming device according to claim 35, wherein the at least one symbol indicator comprises at least one pointer disposed within the symbol carrier periphery.

38. The gaming device according to claim 28, wherein:

the central processor carries out instructions to randomly determine a game outcome; and the central processor carries out instructions to provide a payout associated with the final display and according to the game outcome.

39. The gaming device according to claim 28, wherein the wager input device comprises at least one of a coin acceptor, a bill acceptor, a credit/debit card reader and a player tracking card reader.

40. The gaming device according to claim 28, wherein the display device comprises at least one of a video monitor and an electromechanical display.

41. A gaming method comprising:

receiving a wager;

displaying a plurality of spaced apart symbol carriers, each symbol carrier have a plurality of symbols thereon;

displaying relative motion between the plurality of symbols on each of the symbol carriers and at least one associated symbol indicator for each of the symbol carriers, the at least one associated symbol indicator indicating at least one chosen symbol for each of the symbol carriers;

displaying the plurality of spaced apart symbol carriers moving as a group about a central axis substantially transverse to a plane in which the symbol carriers are moving;

displaying a final display with the relative motion between the plurality of symbols on each symbol carrier and the at least one associated symbol indicator stopped and the motion of the plurality of spaced apart symbol carriers about the central axis stopped; and providing a payout associated with the final display.

42. The gaming method according to claim 41, comprising displaying each of the plurality of spaced apart symbol carriers moving about its own symbol carrier central axis substantially transverse to the plane in which the symbol carriers are moving.

43. The gaming method according to claim 41, wherein the at least one symbol indicator comprises a connection between a payline and at least one of the plurality of spaced apart symbol carriers.

44. The gaming method according to claim 41, wherein each of the symbol carriers has the plurality of symbols arranged about a symbol carrier central axis and the at least one symbol indicator comprises a pointer that moves about the symbol carrier central axis.

45. The gaming method according to claim 41, wherein each of the symbol carriers comprises a plurality of compartments, each compartment having at least one of the plurality of symbols disposed therein, and the at least one symbol indicator comprises a highlighted compartment.

46. The gaming method according to claim 41, wherein the at least one symbol indictor comprises a plurality of areas disposed about the periphery of the each of the symbol carriers, each of the areas associated with one of the plurality of symbols.

47. The gaming method according to claim 41, wherein each of the symbol carriers has a plurality of symbol indicators associated therewith.

48. The gaming method according to claim 41, wherein each of the symbol carriers comprises a column having a plurality of segments, each segment having at least one of the plurality of symbols disposed therein.

49. The gaming method according to claim 48, wherein the at least one symbol indicator comprises at least one pointer disposed adjacent to the symbol carrier periphery.

50. The gaming method according to claim 48, wherein the at least one symbol indicator comprises at least one pointer disposed within the symbol carrier periphery.

51. The gaming device according to claim 41, comprising:

randomly determining a game outcome; and providing a payout associated with the final display and according to the game outcome.

52. A gaming method comprising:

receiving a wager;

displaying a plurality of spaced apart symbol carriers, each symbol carrier have a plurality of symbols thereon, and a plurality of pay lines, the plurality of spaced apart symbol carriers including a centrally located symbol carrier and a group of symbol carriers disposed about the centrally located symbol carrier, and at least some of the plurality of pay lines being associated with at least two symbol carriers of the group of symbol carriers and the central symbol carrier;

displaying relative motion between the plurality of symbols on each of the symbol carriers and at least one associated symbol indicator for each of the symbol carriers, the at least one associated symbol indicator indicating at least one chosen symbol for each of the symbol carriers;

displaying a final display with the relative motion between the symbols on each symbol carrier and the at least one associated symbol indicator stopped; and providing a payout associated with the final display.

53. The gaming method according to claim 52, comprising displaying each of the plurality of spaced apart symbol carriers moving about its own symbol carrier central axis substantially transverse to the plane in which the symbol carriers are moving.

54. The gaming method according to claim 52, wherein the at least one symbol indicator comprises a connection between a payline and at least one of the plurality of spaced apart symbol carriers.

55. The gaming method according to claim 52, wherein each of the symbol carriers has the plurality of symbols arranged about a symbol carrier central axis and the at least one symbol indicator comprises a pointer that moves about the symbol carrier central axis.

56. The gaming method according to claim 52, wherein each of the symbol carriers comprises a plurality of compartments, each compartment having at least one of the plurality of symbols disposed therein, and the at least one symbol indicator comprises a highlighted compartment.

57. The gaming method according to claim 52, wherein the at least one symbol indictor comprises a plurality of areas disposed about the periphery of the each of the symbol carriers, each of the areas associated with one of the plurality of symbols.

58. The gaming method according to claim 52, wherein each of the symbol carriers has a plurality of symbol indicators associated therewith.

59. The gaming method according to claim 52, wherein each of the symbol carriers comprises a column having a plurality of segments, each segment having at least one of the plurality of symbols disposed therein.

60. The gaming method according to claim 59, wherein the at least one symbol indicator comprises at least one pointer disposed adjacent to the symbol carrier periphery.

61. The gaming method according to claim 59, wherein the at least one symbol indicator comprises at least one pointer disposed within the symbol carrier periphery.

62. The gaming device according to claim 52, comprising:

randomly determining a game outcome, and providing a payout associated with the final display and according to the game outcome.

* * * * *

UNITED STATES PATENT AND TRADEMARK OFFICE

CERTIFICATE OF CORRECTION

PATENT NO. : 6,905,405 B2
DATED : June 14, 2005
INVENTOR(S) : Monica A. McClintic It is certified that error appears in the above-identified patent and that said Letters Patent is hereby corrected as shown below:

Column 15,
Line 16, "indictor" should be -- indicator --.

Column 17,
Line 38, "indictor" should be -- indicator --.
Line 62, "have" should be -- having --.

Column 18,
Line 40, "indictor" should be -- indicator --.

Signed and Sealed this

Twenty-fifth Day of October, 2005

JON W. DUDAS
*Director of the United States Patent and Trademark Office*